US012434545B2

(12) United States Patent
Sato et al.

(10) Patent No.: US 12,434,545 B2
(45) Date of Patent: Oct. 7, 2025

(54) LID OPENING/CLOSING DEVICE

(71) Applicant: TOYODA GOSEI CO., LTD., Kiyosu (JP)

(72) Inventors: Kaho Sato, Kiyosu (JP); Kenichiro Kaneko, Kiyosu (JP)

(73) Assignee: TOYODA GOSEI C0., LTD., Aichi-pref. (JP)

( * ) Notice: Subject to any disclaimer, the term of this patent is extended or adjusted under 35 U.S.C. 154(b) by 0 days.

(21) Appl. No.: 18/598,594

(22) Filed: Mar. 7, 2024

(65) Prior Publication Data
US 2024/0317036 A1   Sep. 26, 2024

(30) Foreign Application Priority Data

Mar. 24, 2023 (JP) ................................. 2023-049087

(51) Int. Cl.
*B60J 10/84* (2016.01)
*B60J 10/15* (2016.01)

(52) U.S. Cl.
CPC .............. *B60J 10/84* (2016.02); *B60J 10/15* (2016.02)

(58) Field of Classification Search
CPC . B60J 10/84; B60J 10/15; B60K 2015/03447; B60K 2015/053; B60K 2015/0553
USPC ........... 49/499.1, 500.1, 496.1, 490.1, 493.1, 49/495.1; 296/97.22
See application file for complete search history.

(56) References Cited

U.S. PATENT DOCUMENTS

| | | | | |
|---|---|---|---|---|
| 4,858,988 A | * | 8/1989 | Morgan ................... | B60J 10/24 52/716.5 |
| 5,331,767 A | * | 7/1994 | Takeuchi ................. | B60J 10/70 49/490.1 |
| 6,089,644 A | * | 7/2000 | Mittelhauser .......... | B60K 15/05 296/97.22 |
| 7,380,862 B2 | * | 6/2008 | Olney ...................... | B60J 10/90 49/495.1 |
| 8,104,818 B2 | * | 1/2012 | Barre ...................... | B60R 13/06 296/70 |
| 8,667,739 B2 | * | 3/2014 | Brookman ............... | E06B 7/23 49/495.1 |

(Continued)

FOREIGN PATENT DOCUMENTS

| | | | | |
|---|---|---|---|---|
| CN | 211663189 U | 10/2020 | | |
| DE | 102014104501 A1 | * 10/2015 | ............. | B60K 15/05 |
| FR | 2913924 A1 | * 9/2008 | ......... | B60K 15/0406 |

*Primary Examiner* — Daniel P Cahn
*Assistant Examiner* — Patrick B. Ponciano
(74) *Attorney, Agent, or Firm* — Posz Law Group, PLC

(57) ABSTRACT

A lid opening/closing device includes: a lid box having a housing space in which a supply port is housed and an opening through which the housing space is exposed to a vehicle body outside, the lid box being mounted on a vehicle body; a lid configured to open/close the opening; a seal portion sandwiched between the lid box and the lid and elastically deformed at a closed position of the lid; and a gap placement portion placed at a gap portion formed between an outer edge portion of the lid and the vehicle body at the closed position of the lid, the gap placement portion being spaced apart from the outer edge portion of the lid and in contact with the vehicle body at the closed position of the lid. The gap placement portion is formed of a material that is more water repellent than the vehicle body.

2 Claims, 4 Drawing Sheets

(56) References Cited

U.S. PATENT DOCUMENTS

| | | | | |
|---|---|---|---|---|
| 8,985,668 | B2* | 3/2015 | Ogata | F16J 15/02 |
| | | | | 296/97.22 |
| 9,376,012 | B2* | 6/2016 | Brown | B60K 15/05 |
| 9,481,240 | B1* | 11/2016 | Stack | B60K 15/05 |
| 9,902,248 | B2* | 2/2018 | Inai | B60J 10/27 |
| 11,660,945 | B2* | 5/2023 | Muylkens | B60J 10/18 |
| | | | | 49/476.1 |
| 12,220,982 | B2* | 2/2025 | Nakamura | B60L 53/16 |
| 2001/0025455 | A1* | 10/2001 | Nozaki | B60J 10/76 |
| | | | | 49/495.1 |
| 2005/0081451 | A1* | 4/2005 | Tamura | B60J 10/24 |
| | | | | 49/490.1 |
| 2007/0046062 | A1* | 3/2007 | Yoshimura | B60K 15/04 |
| | | | | 296/97.22 |
| 2012/0161462 | A1* | 6/2012 | Zentner | B60K 15/04 |
| | | | | 296/97.22 |
| 2015/0090713 | A1* | 4/2015 | Betzen | B60K 15/05 |
| | | | | 220/86.2 |
| 2016/0101686 | A1* | 4/2016 | Brown | B60K 15/05 |
| | | | | 296/97.22 |
| 2024/0317036 | A1* | 9/2024 | Sato | B60J 10/15 |

\* cited by examiner

LID OPENING/CLOSING DEVICE

TECHNICAL FIELD

The present invention relates to a lid opening/closing device that opens/closes an opening of a lid box, which is mounted on a vehicle body, using a lid.

BACKGROUND ART

Hitherto, a lid opening/closing device that is mounted on a vehicle and opens/closes an opening of a lid box using a lid has been known (e.g., CN211663189 (U)). The lid opening/closing device described in CN211663189 (U) includes a lid box, a lid, and a lip seal.

The lid box is a base member in which a supply port such as a charge port or a fuel port of a vehicle is housed and which exposes the supply port to the outside. The lid box is mounted on a vehicle body. The lid is a lid member that opens/closes an opening of the lid box. The lid is, for example, supported on the lid box via a hinge member so as to be openable/closable. The lip seal is a sealing component interposed between a peripheral portion of the opening of the lid box and the lid at a lid closed position.

The lip seal is placed on the far side of a gap portion formed between an outer edge portion of the lid and the vehicle body at the lid closed position, rather than on the near side of the gap portion. At the lid closed position, the lip seal is sandwiched between the peripheral portion of the opening of the lid box and the lid and closes the gap between the lid box and the lid. The lip seal prevents water, snow, dust, etc., entering the gap portion from the near side of the gap portion at the lid closed position, from entering the lid box.

SUMMARY OF INVENTION

Technical Problem

However, even when the above lip seal is interposed between the peripheral portion of the opening of the lid box and the lid, preventing water from adhering at a space-forming portion from the near side of the above gap portion to a seal portion of the lip seal at the lid closed position is difficult. Therefore, in a structure in which a vehicle body made of metal is exposed to the space side as a space-forming portion, if water adhering to the vehicle body freezes in a low-temperature environment having a temperature of 0° C. or lower, the outer edge portion of the lid and the vehicle body are likely to be fixed to each other due to the progress of freezing, and as a result, opening the lid may become difficult.

The present invention has been made in view of such circumstances, and an object of the present invention is to provide a lid opening/closing device capable of preventing a lid and a vehicle body from being fixed to each other at a lid closed position due to freezing.

Solution to Problem

An aspect of the present invention is directed to a lid opening/closing device including: a lid box having a housing space in which a supply port is housed and an opening through which the housing space is exposed to a vehicle body outside, the lid box being mounted on a vehicle body; a lid configured to open/close the opening; a seal portion sandwiched between the lid box and the lid and elastically deformed at a closed position of the lid; and a gap placement portion placed at a gap portion formed between an outer edge portion of the lid and the vehicle body at the closed position of the lid, the gap placement portion being spaced apart from the outer edge portion of the lid and in contact with the vehicle body at the closed position of the lid, wherein the gap placement portion is formed of a material that is more water repellent than the vehicle body.

With this configuration, the lid and the vehicle body are prevented from being fixed to each other at the lid closed position due to freezing.

DESCRIPTION OF EMBODIMENTS

Figure 1:
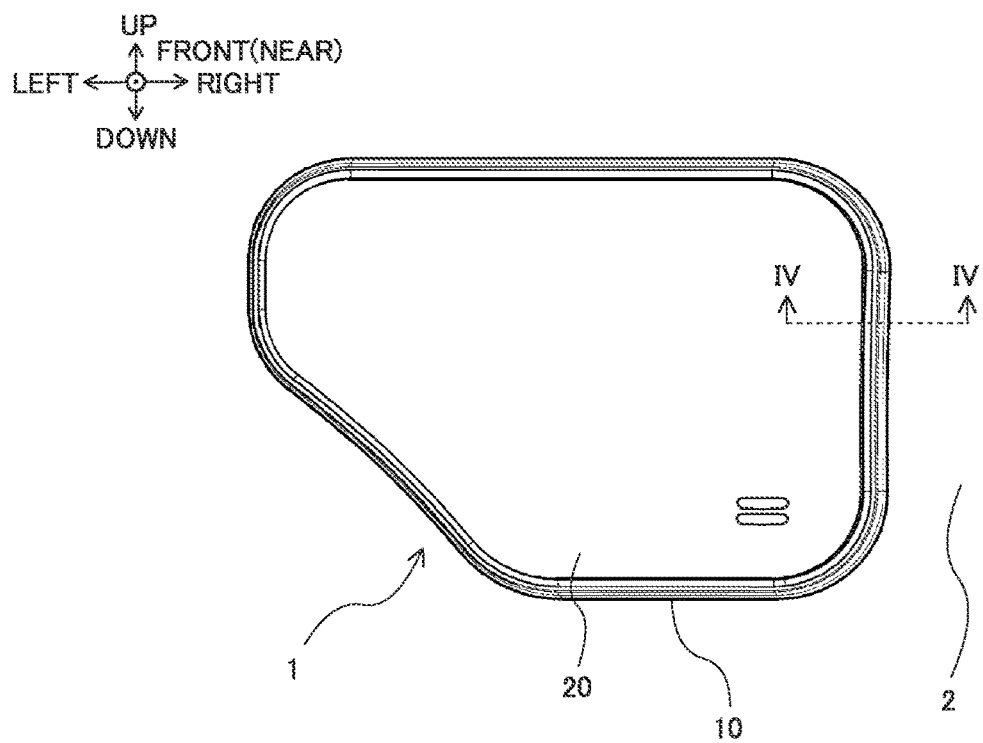
FIG. 1 is a front view of a lid opening/closing device mounted on a vehicle according to an embodiment of the present invention.

Hereinafter, a specific embodiment of the lid opening/closing device according to the present invention will be described with reference to FIG. 1 to FIG. 6.

A lid opening/closing device 1 according to the embodiment is a device that opens/closes an opening of a lid box, which is mounted on a vehicle body, using a lid.

The lid opening/closing device 1 is mounted, for example, on a vehicle such as a gasoline vehicle, a diesel vehicle, an electric vehicle, and a hybrid vehicle. The lid opening/closing device 1 is installed on a vehicle body 2 such as a fender at a vehicle body side or front portion so as to be fitted into a mounting hole 2a (see FIG. 3). For example, a supply port (specifically, a charge port, a fuel port, or the like: see FIG. 2) 3 for supplying energy to the vehicle is placed on a far side of the mounting hole 2a. In the present embodiment, directions are indicated on the basis of the case where the lid opening/closing device 1 is viewed from the outside of the vehicle, as appropriate, a direction connecting the outer side (near side) of the vehicle and the inner side (far side) of the vehicle is referred to as front-back direction, a horizontal direction along the front surface of the vehicle body 2 is referred to as right-left direction, and a vertical direction along the vehicle body 2 is referred to as up-down direction.

As shown in FIG. 1 to FIG. 4, the lid opening/closing device 1 includes a lid box 10, a lid 20, an opening/closing mechanism 30, and a lip seal 40. The lid opening/closing device 1 transmits power to the lid 20 by drive of the opening/closing mechanism 30, thereby opening/closing the lid 20 with respect to the lid box 10.

The lid box 10 is a container member in which the supply port 3 is housed. The lid box 10 is a bottomed tubular member formed in a box shape. The lid box 10 is mounted on the vehicle body 2 so as to be fitted into the mounting hole 2a. The lid box 10 is molded from a resin such as polypropylene, for example. The lid box 10 is, for example, an injection-molded article. The lid box 10 includes a bottom wall portion 11, a side wall portion 12, a housing space 13, an opening 14, and a frame portion 15.

The bottom wall portion 11 is a plate-shaped portion placed on the far side with respect to the vehicle body 2. The side wall portion 12 is erected from the periphery of the bottom wall portion 11 and surrounds the periphery of the bottom wall portion 11. The housing space 13 is a space in which the supply port 3 is housed. The housing space 13 is defined by the bottom wall portion 11 and the side wall portion 12. The opening 14 is a portion through which the housing space 13 and the supply port 3 are exposed to the vehicle body outside. The opening 14 is provided on the near side of the housing space 13. The frame portion 15 is a flange-shaped portion extending in a frame outward direction from the near-side end of the side wall portion 12. The frame portion 15 is formed in an annular shape along the periphery of the opening 14.

The supply port 3 is provided at one end of a pipe or cable connected at another end thereof to a fuel tank, a battery, or the like. The fuel tank or the battery is placed on the far side with respect to the bottom wall portion 11. The supply port 3 is placed so as to be exposed to the near side through a through hole 11a provided in the bottom wall portion 11, and is housed in the housing space 13. While the supply port 3 is hidden on the far side of the lid 20 at the closed position of the lid 20, the supply port 3 is exposed to the vehicle body outside through the opening 14 at the opened position of the lid 20 so as to allow fuel supply and charging.

The vehicle body 2 is formed of a metal such as a steel plate or aluminum. The vehicle body 2 may be painted on the front surface thereof on the vehicle body outer side. The vehicle body 2 is formed in an L cross-sectional shape by bending from the edge of the front surface of the vehicle body 2 on the mounting hole 2a side to the far side and further bending so as to be parallel to the front surface of the vehicle body 2. That is, the vehicle body 2 includes an erection wall portion 2b and a flange portion 2c.

The erection wall portion 2b and the flange portion 2c are provided at a peripheral portion of the mounting hole 2a in the vehicle body 2, and are formed in an annular shape. The erection wall portion 2b is connected to the edge of the front surface of the vehicle body 2 on the mounting hole 2a side and extends toward the far side. The flange portion 2c is connected to the far-side end of the erection wall portion 2b and extends inward. The flange portion 2c is placed on the far side with respect to the front surface of the vehicle body 2.

The lid box 10 is positioned relative to the vehicle body 2 by the back surface of the frame portion 15 opposing and coming into contact with the flange portion 2c of the vehicle body 2. The lid box 10 is mounted and fixed to the vehicle body 2 by bolting, claw-fitting, an adhesive, or the like in a state where the lid box 10 is fitted into the mounting hole 2a and positioned relative to the vehicle body 2.

The lid 20 is a lid member for opening/closing the opening 14 of the lid box 10. The lid 20 is formed in a plate shape. The lid 20 is sized so as to match the opening 14 and the frame portion 15 at the periphery of the opening 14. The lid 20 closes the opening 14 at the closed position of the lid 20 such that the lid 20 is flush with the vehicle body 2. The front surface of the lid 20 may be curved so as to match the vehicle body 2. The lid 20 is molded from a resin such as polypropylene, for example. The lid 20 is, for example, an injection-molded article. In addition, the front surface of the lid 20 on the vehicle body outer side may be painted in the same manner as the vehicle body 2, for example.

The lid 20 is capable of being opened/closed so as to move between the closed position and the opened position. The closed position is a position at which the lid 20 closes the opening 14. In addition, the opened position is a fully-opened position at which the lid 20 opens the opening 14. The lid 20 is supported so as to be movable in position relative to the lid box 10. The lid 20 is capable of being opened/closed by power transmitted from the opening/closing mechanism 30.

The opening/closing mechanism 30 is a mechanism that opens/closes the lid 20 with respect to the lid box 10 between the closed position and the opened position. The opening/closing mechanism 30 is interposed between the lid box 10 and the lid 20. The opening/closing mechanism 30 is configured to include an arm, a link, or the like connecting the lid box 10 and the lid 20.

The opening/closing mechanism 30 may be, for example, a mechanism that opens/closes the lid 20 by using power generated by an actuator such as a motor, a mechanism that opens/closes the lid 20 by using an external force caused by a manual operation of an operator as power, or a mechanism that opens/closes the lid 20 by selectively using the power generated by the actuator and the external force. Furthermore, the opening/closing mechanism 30 may be a mechanism that uses different types of power sources as a power source for opening the lid 20 and a power source for closing the lid 20. For example, the power source for opening the lid 20 may be an actuator, and the power source for closing the lid 20 may be a manual operation of the operator.

Moreover, the opening/closing mechanism 30 may be a mechanism that opens the lid 20 by using an actuator during normal operation but opens the lid 20 through a manual operation of the operator in an emergency such as a failure of the actuator.

Figure 2:
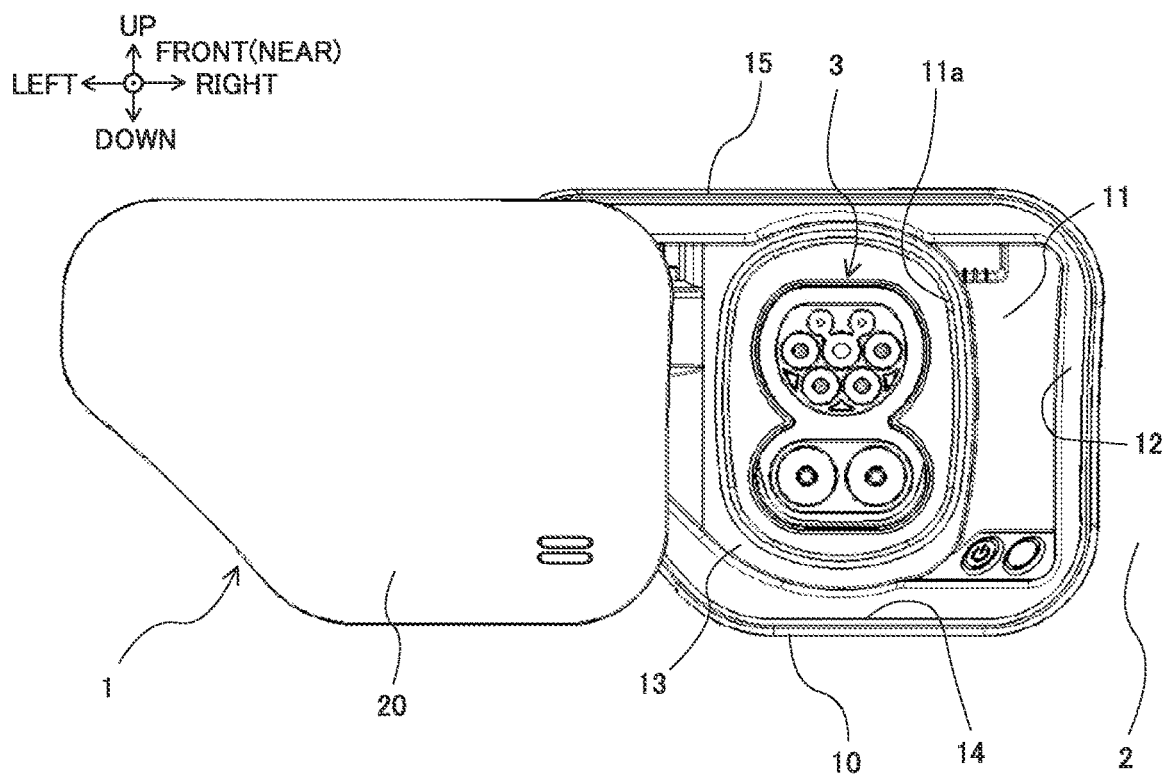
FIG. 2 is a front view of the lid opening/closing device of the embodiment at a lid opened position.
Figure 3:
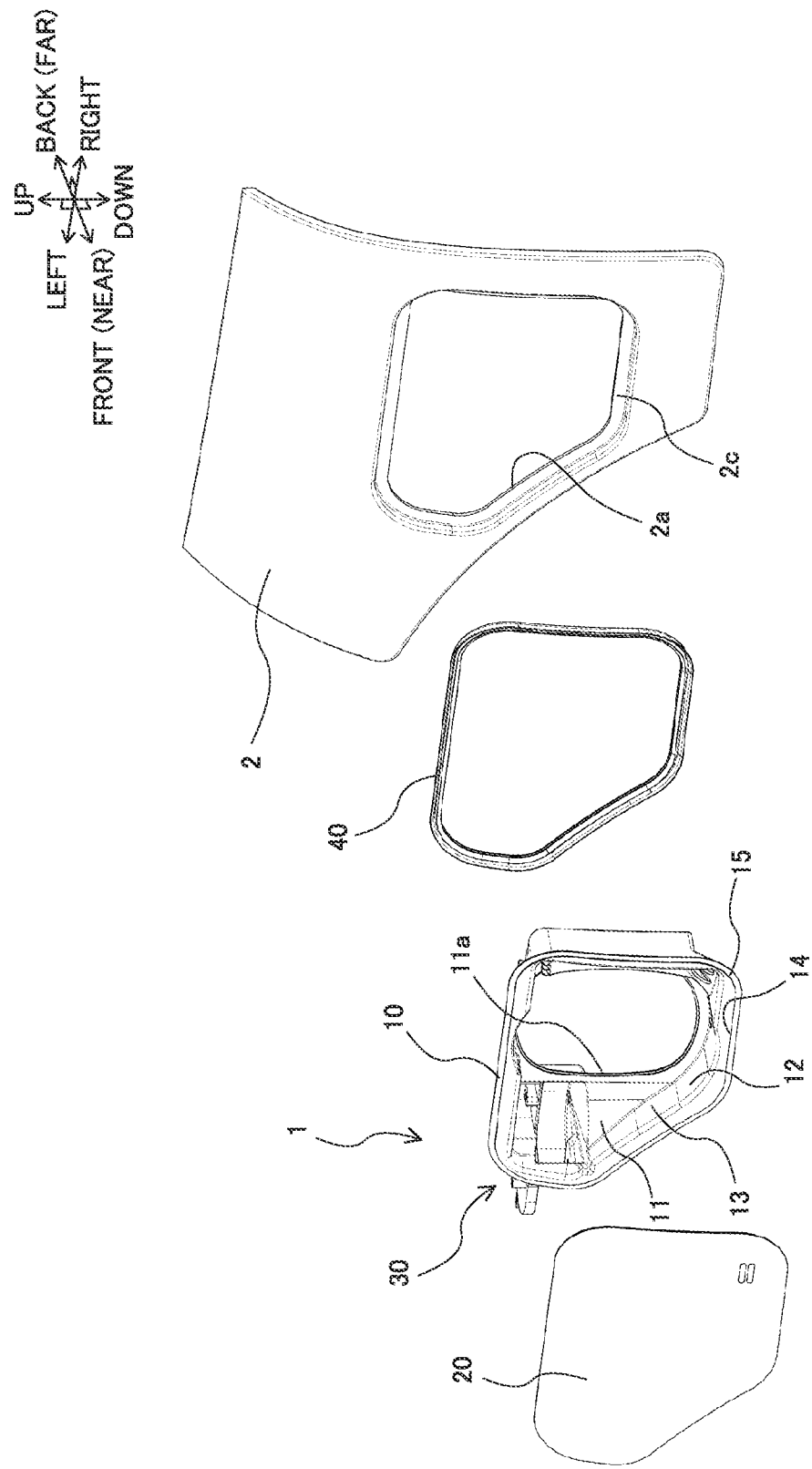
FIG. 3 is an exploded view of the lid opening/closing device of the embodiment.

Furthermore, the opening/closing mechanism 30 may be a sliding type mechanism that moves the lid 20 while maintaining a state where the lid 20 is parallel to the opening 14 when opening/closing the lid 20, or a gooseneck type mechanism that rotates the lid 20 about an axis extending substantially parallel to the opening 14 when opening/closing the lid 20. In addition, the direction in which the opening/closing mechanism 30 opens/closes the lid 20 with respect to the lid box 10 may be the up-down direction or the right-left direction. FIG. 2 and FIG. 3 show the opening/closing mechanism 30 which is of a sliding type and of a type opening/closing in the right-left direction.

The lip seal 40 is a sealing component interposed between the peripheral portion of the opening 14 of the lid box 10 and the lid 20 at the closed position of the lid 20. The lip seal 40 is formed of a material that is more water repellent than the vehicle body 2, and is formed from an elastically deformable material. The lip seal 40 is made of a rubber containing a water-repellent material and an elastic material.

Water repellency is an index indicating the degree of difficulty of wetting or repelling water droplets on a solid surface (i.e., wettability). For example, a contact angle, which is the angle between a solid surface and a liquid surface, is used as an index for evaluating water repellency. As this contact angle, not only a so-called static contact angle but also dynamic contact angles such as an advancing contact angle and a retracting contact angle may be used. As a method for measuring the contact angle, a droplet method, an expansion and contraction method, a sliding method, a dynamic sliding method, etc., are used.

The lip seal 40 is made of, for example, a thermoplastic elastomer (TPE), and particularly preferably made of a dynamic crosslinked thermoplastic elastomer (TPV) made by crosslinking a thermoplastic resin with rubber, or the like. Examples of the TPV include a combination of polypropylene (PP) and ethylene propylene diene rubber (EPDM), etc. PP has the property of not chemically bonding (i.e., covalently bonding) to materials other than resin. The contact angle of the vehicle body 2 to water is, for example, less than 90°, and the contact angle of the lip seal 40 to water is, for example, not less than 90°.

The lip seal 40 is formed in an annular shape so as to extend over the entire circumference of an outer edge portion of the lid 20. The lip seal 40 includes a box mounting portion 41, a seal portion 42, and a gap placement portion 43. The box mounting portion 41, the seal portion 42, and the gap placement portion 43 are formed integrally with each other. That is, the lip seal 40 integrally includes the box mounting portion 41, the seal portion 42, and the gap placement portion 43.

The box mounting portion 41 is a portion for mounting the lip seal 40 on the lid box 10. The box mounting portion 41 is formed in a U cross-sectional shape or a bifurcated cross-sectional shape so as to sandwich an outer edge portion of the frame portion 15 of the lid box 10 in the front-back direction. In other words, the box mounting portion 41 has a groove 41a into which the outer edge portion of the frame portion 15 of the lid box 10 is fitted. The groove 41a is formed in an annular shape. The lip seal 40 is mounted on the lid box 10 by fitting the outer edge portion of the frame portion 15 into the groove 41a.

The box mounting portion 41 is in contact with the front surface of the flange portion 2c of the vehicle body 2 at a portion thereof on the far side with respect to the groove 41a. The lid box 10 opposes and is in contact with the flange portion 2c of the vehicle body 2 via the far-side portion of the box mounting portion 41. The lid box 10 and the vehicle body 2 may be sealed by the box mounting portion 41 of the lip seal 40.

The seal portion 42 is a portion that is sandwiched between the lid box 10 and the lid 20 and elastically deformed at the closed position of the lid 20. The seal portion 42 is sandwiched between the front surface of the frame portion 15 of the lid box 10 and the back surface of the outer edge portion of the lid 20 and begins to be elastically deformed immediately before the closed position of the lid 20, and the amount of elastic deformation thereof becomes maximum at the closed position of the lid 20. The seal portion 42 is connected to, for example, the inner end (left end in FIG. 4) of a portion on the near side with respect to the groove 41a in the box mounting portion 41. The seal portion 42 extends from the inner end toward the near side and outwardly (rightward in FIG. 4) so as to be curved or inclined. The seal portion 42 has a so-called cantilevered shape.

At the opened position of the lid 20, the seal portion 42 is not in contact with the back surface of the outer edge portion of the lid 20 and thus is brought into a posture in which the seal portion 42 stands on the near side with the inner end of the near-side portion of the box mounting portion 41 as a base point. On the other hand, at the closed position of the lid 20, the seal portion 42 is elastically deformed by being brought into contact with the back surface of the outer edge portion of the lid 20 and pressed toward the far side, and is brought into a posture in which the seal portion 42 lies on the outer side with the inner end of the near-side portion of the box mounting portion 41 as a base point.

Figure 4:
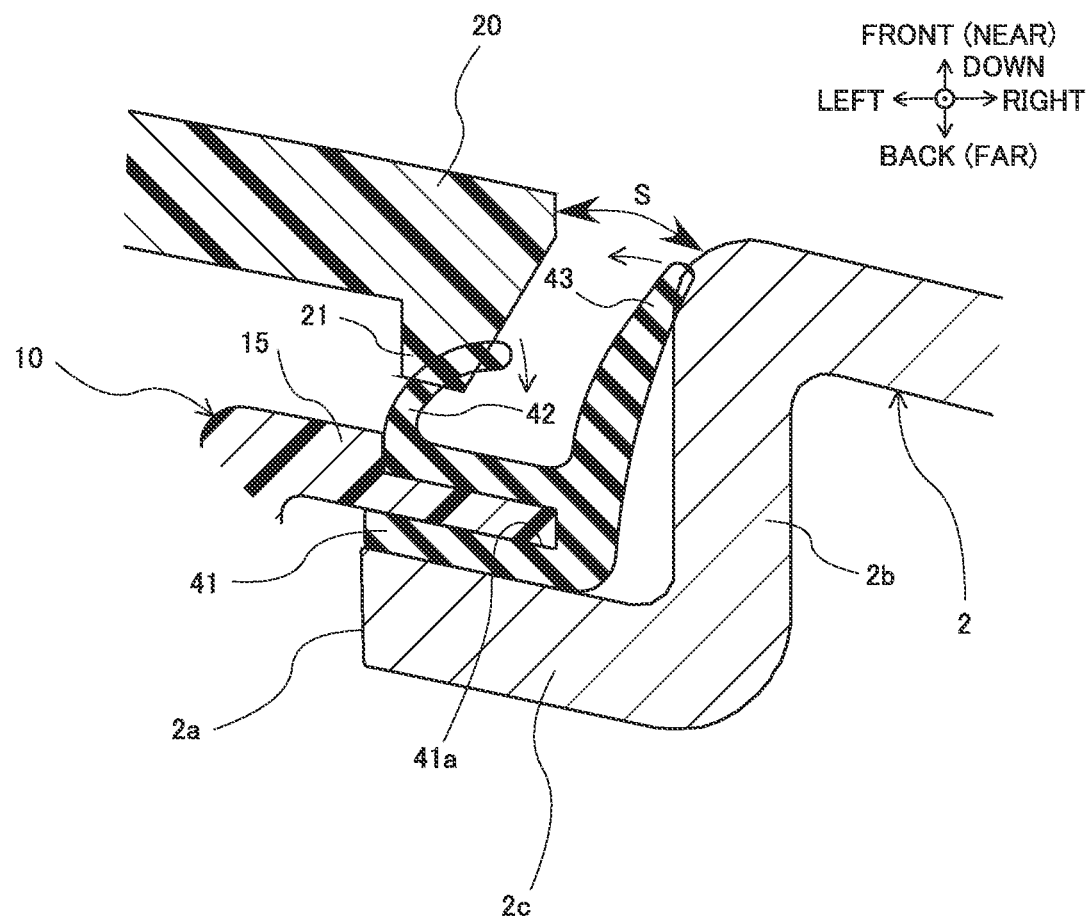
FIG. 4 is a cross-sectional view of the lid opening/closing device of the embodiment taken along IV-IV in FIG. 1.

As shown in FIG. 4, the lid 20 may include a protruding portion 21 formed in a shape protruding from the back surface of the outer edge portion thereof toward the far side, and the lid 20 may come into contact with the seal portion 42 at the protruding portion 21.

The gap placement portion 43 is a portion placed at a gap portion S (see FIG. 4) formed between the outer edge portion of the lid 20 and the vehicle body 2 at the closed position of the lid 20. The gap portion S has, for example, a size of about 3 mm. In addition, the gap portion S occupies a space with depth from the front surfaces of the lid 20 and the vehicle body 2 to the back side, and is provided so as to surround the outer side of the outer edge portion of the lid 20 over the entire circumference.

The gap placement portion 43 may be provided only at a part in the front-back direction of the above gap portion S. That is, the gap placement portion 43 may be placed at a part in the front-back direction of the above gap portion S. For example, in order to ensure the design property of the front-surface side of the vehicle body 2, the gap placement portion 43 may be placed at the gap portion S excluding the vicinity of the front-surface side of the vehicle body 2 (e.g., a range of about 1 mm from the front surface) such that the gap placement portion 43 is not easily visible from the front-surface side of the vehicle body 2. The near-side end (that is, the distal end) of the gap placement portion 43 is located on the near side with respect to the back surface (far-side end surface) of the lid 20, and is located on the near side with respect to the distal end of the above seal portion 42.

The gap placement portion 43 is spaced outwardly from the outer edge portion of the lid 20 and in contact with the vehicle body 2 at the closed position of the lid 20. That is, at the closed position of the lid 20, the gap placement portion 43 and the outer edge portion of the lid 20 are placed apart from each other. The gap placement portion 43 is in contact with the erection wall portion 2b of the vehicle body 2 at any position of the lid 20 including the closed position. The gap placement portion 43 only needs to have, for example, a thickness of about 0.3 mm at a near-side end portion (that is, a distal end portion) thereof, and this thickness may be smaller than that of a far side-end portion of the gap placement portion 43.

The gap placement portion 43 may be connected to, for example, the outer end (right end in FIG. 4) of the box mounting portion 41, and may include a portion that is placed at a location that is not the above gap portion S, that is, a location where the gap placement portion 43 does not oppose the outer edge portion of the lid 20. The gap placement portion 43 is formed in a plane shape so as to oppose the erection wall portion 2b. A gap that is generally smaller than the size (width) of the gap portion S by the thickness of the near-side end portion of the gap placement portion 43 is formed between the outer edge portion of the lid 20 and an inner end portion of the gap placement portion 43.

To ensure sealing between the lid box 10 and the vehicle body 2, the gap placement portion 43 only needs to be in contact with at least a part of the erection wall portion 2b, and may be in contact with the entirety of the erection wall portion 2b. In addition, to ensure the design property of the vehicle body 2 side, preferably, the gap placement portion 43 is in contact with a near-side end portion of the erection wall portion 2b, that is, the near-side end portion of the gap placement portion 43 is in contact with the vehicle body 2. When the lid box 10 is mounted and fixed to the vehicle body 2, the gap placement portion 43 is elastically deformed by being brought into contact with the erection wall portion 2b of the vehicle body 2 and pressed toward the inner side (rightward in FIG. 4). Accordingly, sealing is ensured between the lid box 10 and the vehicle body 2, and the design property of the vehicle body 2 side is ensured.

Next, the operation of the lid opening/closing device 1 will be described.

In the lid opening/closing device 1, when the lid 20 is at the closed position, the lid 20 is positioned relative to the lid box 10. In this case, the gap placement portion 43 of the lip seal 40 is placed at the gap portion S between the lid 20 and the vehicle body 2 so as to be spaced apart from the outer edge portion of the lid 20 and be in contact with the erection wall portion 2b of the vehicle body 2. In this structure, the vehicle body 2 itself is not exposed to the outer edge portion side of the lid 20, or a region of the erection wall portion 2b, of the vehicle body 2, opposing the outer edge portion of the lid 20 is limited, and the region is exposed to the outer edge portion side of the lid 20. Therefore, there is no region of the erection wall portion 2b, of the vehicle body 2, opposing the outer edge portion of the lid 20, which is a region to which water directly adheres, or such a region is narrower than the entire region of the erection wall portion 2b.

Also, the lip seal 40 and the gap placement portion 43, which are exposed to the outer edge portion side of the lid 20 in the above structure, are formed of a material that is more water repellent than the vehicle body 2. In this structure, water is less likely to adhere to the region, of the gap placement portion 43, exposed to the outer edge portion of the lid 20, and the amount of water adhering thereto is smaller than in the case where the gap placement portion 43 is not placed at the gap portion S, that is, the case where the vehicle body 2 is exposed to the outer edge portion of the lid 20.

Furthermore, the lid 20 is made of a resin. Therefore, as compared to the case where the lid 20 is made of a metal, water is less likely to adhere to the outer edge portion, of the lid 20, opposing the gap placement portion 43, and the amount of water adhering thereto is smaller.

Figure 5:
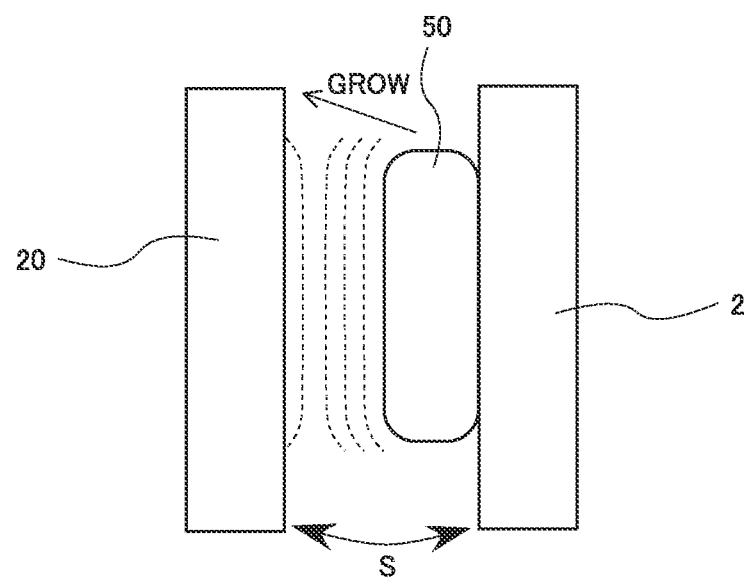
FIG. 5 is a diagram showing a situation in which freezing occurs at a gap portion between a lid and a vehicle body in a lid opening/closing device of a comparative example.
Figure 6:
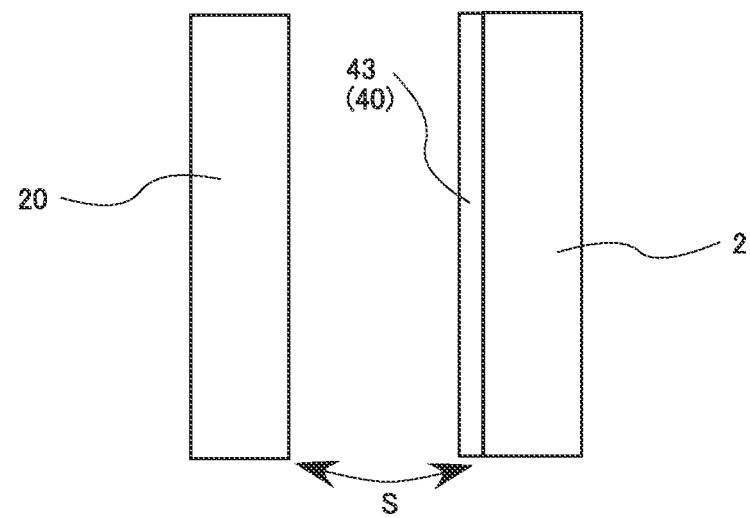
FIG. 6 is a diagram showing a situation in which freezing is less likely to occur at a gap portion between a lid and a vehicle body in the lid opening/closing device of the embodiment.

Thus, in the lid opening/closing device 1, water is less likely to accumulate at the gap portion S formed between the lid 20 and the vehicle body 2 at the closed position of the lid 20 (specifically, the gap between the outer edge portion of the lid 20 and the gap placement portion 43 of the lip seal 40 which is in contact with the outer edge portion side of the lid 20 in the vehicle body 2) (see FIG. 5 and FIG. 6). Therefore, a situation in which, in a low-temperature environment, water freezes at the gap portion S between the outer edge portion of the lid 20 and the vehicle body 2 into ice 50 (see FIG. 5) and the ice 50 grows, is avoided, and thus the outer edge portion of the lid 20 and the vehicle body 2 are prevented from being fixed to each other at the closed position of the lid 20 due to freezing. Therefore, opening from the closed position to the opened position of the lid 20 is prevented from being impaired in a low-temperature environment, so that good opening/closing operability of the lid 20 is ensured.

[Modifications]

In the above embodiment, the seal portion 42, which is sandwiched between the lid box 10 and the lid 20 and elastically deformed at the closed position of the lid 20, and the gap placement portion 43, which is placed at the gap portion S formed between the outer edge portion of the lid 20 and the vehicle body 2 at the closed position of the lid 20, is spaced apart from the outer edge portion of the lid 20 and in contact with the vehicle body 2 at the closed position of the lid 20, and is formed of a material that is more water repellent than the vehicle body 2, are integrally included in the same lip seal 40. However, the present invention is not limited thereto, and the seal portion 42 and the gap placement portion 43 may be provided in different components, respectively. That is, a sealing component forming the seal portion 42 and a gap placement component forming the gap placement portion 43 may be separate and independent of each other.

In the above embodiment, the entirety of the lip seal 40 is formed of a rubber containing a water-repellent material and an elastic material. However, the present invention is not limited thereto, and in the case where a sealing component forming the seal portion 42 and a gap placement component forming the gap placement portion 43 are separate and independent of each other as in the above modification, the sealing component may contain at least an elastic material, and the gap placement component may contain at least a water-repellent material.

In the above embodiment, the gap placement portion 43 is provided as a part of the lip seal 40. However, the present invention is not limited thereto, and the gap placement portion 43 may be applied or attached to the surface, of the erection wall portion 2b of the vehicle body 2, opposing the outer edge portion of the lid 20.

In the above embodiment, since the lip seal 40 is mounted on the lid box 10, the lip seal 40 is fixed in position without changing the position thereof with respect to the lid box 10 and the vehicle body 2. However, the present invention is not limited thereto, and the position of the lip seal 40 may be changed with respect to the lid box 10 and the vehicle body 2 in conjunction with the lid 20 by mounting the lip seal 40 on the lid 20.

The present invention is not limited to the above-described embodiment and modifications, and various changes may be made without departing from the gist of the present invention. In addition, the present specification discloses not only the technical concept indicated by the citation relationship between the claims as originally filed, but also the technical concept obtained by combining the matters recited in each claim as appropriate.

This application claims priority on Japanese Patent Application No. 2023-049087 filed in Japan on Mar. 24, 2023, the entire contents of which are incorporated herein by reference.

The invention claimed is:

1. A lid opening/closing device comprising:
 a lid box having a housing space in which a supply port is housed and an opening through which the housing space is exposed to a vehicle body outside, the lid box further including a frame portion formed annularly along a peripheral portion of the opening and being mounted on a vehicle body;
 a lid configured to open/close the opening; and
 a lip seal interposed between the peripheral portion of the opening of the lid box and the lid at a closed position of the lid,
  the lip seal includes a box mounting portion, a seal portion, and a gap placement portion;
  the box mounting portion for mounting the lip seal on the lid box;
  the seal portion sandwiched between the lid box and the lid and elastically deformed at the closed position of the lid;

the gap placement portion placed at a gap portion formed between an outer edge portion of the lid and the vehicle body at the closed position of the lid, the gap placement portion being spaced apart from the outer edge portion of the lid and in contact with the vehicle body at the closed position of the lid, wherein the box mounting portion, the seal portion, and the gap placement portion of the lip seal are integrally formed;

the box mounting portion has a groove into which the an outer edge portion of the frame portion of the lid box is fitted;

the lip seal is mounted on the lid box by fitting the outer edge portion of the frame portion into the groove; and the gap placement portion is formed of a material that is more water repellent than the vehicle body.

2. The lid opening/closing device according to claim 1, wherein an entirety of the lip seal is made of a rubber containing the material that is more water repellent than the vehicle body.

* * * * *